Bulkley & Norton,
Shearing Metal,

№ 4,866. Patented Nov. 28, 1846.

UNITED STATES PATENT OFFICE.

W. BULKLEY AND P. NORTON, OF BERLIN, CONNECTICUT.

CIRCULAR SHEARS.

Specification of Letters Patent No. 4,866, dated November 28, 1846.

*To all whom it may concern:*

Be it known that we, WILLIAM BULKLEY and PHILIP NORTON, of Berlin, in the county of Hartford and State of Connecticut, have made certain new and useful Improvements in Machines for Cutting Sheet Metal into Circular Plates, said improvements being on the machine for which Letters Patent of the United States were granted to Andrew Tracy on the 17th July, 1841, and also on that for which Letters Patent were granted to Wm. Bulkley and Otis M. Inman on the 3d of November, 1841, both of which patents have been assigned to us and are now our exclusive property; and we do hereby declare that the following is a full and exact description of our improvements.

We use a bow, or frame, which like that used by Bulkley and Inman, revolves on a short vertical shaft, or pivot, at its center, the metal to be cut being held by similar means on the upper end of said shaft, or pivot; and we effect the cutting by causing the bow or frame to revolve, as in said machine. In this machine the cutters were each attached on opposite sides of the frame, and when the size of the circle to be cut was changed, the cutters had not only to be adjusted to the size required, but also to each other; causing great loss of time. In Tracy's machine the objection of the resetting of the cutters at every change of size, was removed, said cutters having been attached to a slide, or stock, that was capable of being removed to different distances from the center, on a lever, or arm, which was moved around instead of causing the frame to revolve in the operation of cutting. This arrangement was attended with the difficulty of its being necessary to divide the sheet to be cut into separate pieces before cutting them into the desired circles, a procedure not only attended with much loss of time, but with a great waste of material; it is a point of importance, in numerous instances to cut a dozen circles, more or less, out of one plate, without first dividing it, this, manifestly, allowing, in many cases, of the cutting of an increased number of circular pieces from the same plate. The difficulties appertaining to both the machines above named we have obviated in that which we are now about to describe, and which is represented in the accompanying drawings, in which—

Figure 3:
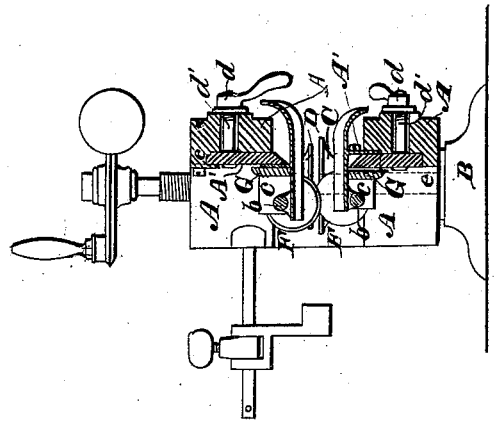
Figure 2:
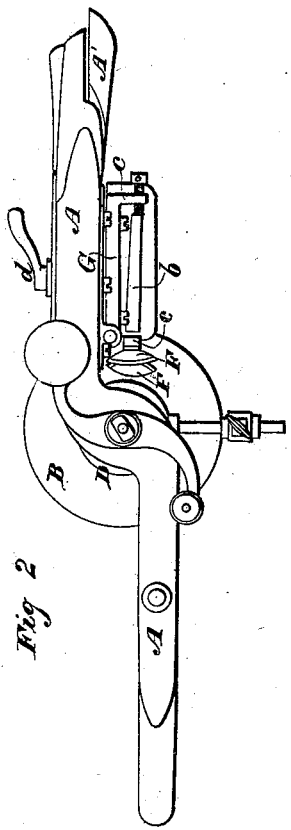
Figure 1:
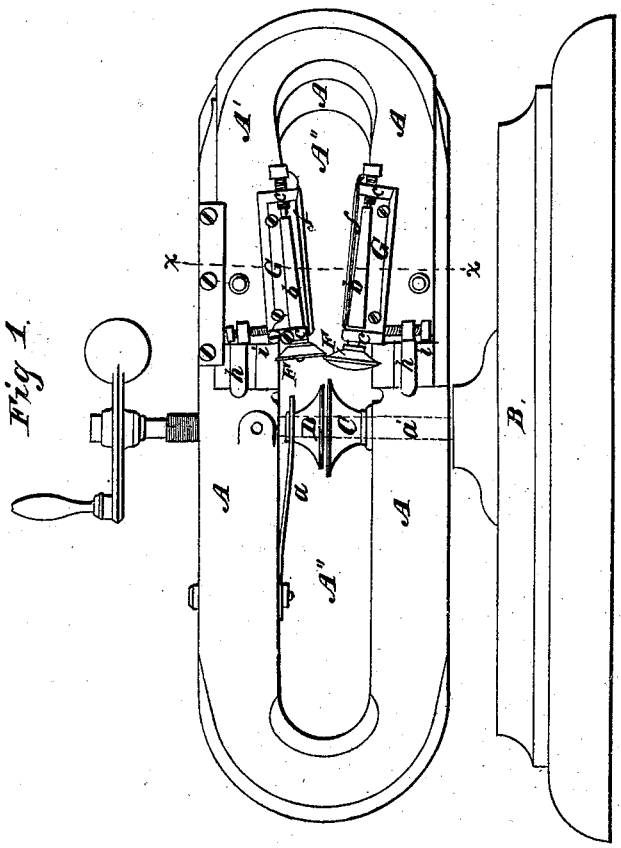

Figure 1, is a side elevation of our machine. Fig. 2, a top view of it, and Fig. 3, a vertical cross section in the line $x, x$, of Fig. 1.

A, A, is a revolving frame, or bow, of cast iron, that carries on one of its ends an adjustable slide, which sustains the circular shears. The frame or bow A, revolves on a vertical shaft, or pivot, shown by the dotted lines $a'$ Fig. 1, which may rise from a stand B, or be firmly affixed to a bench. On the upper end of the pivot $a'$, is a circular support C, upon which the plate to be cut is sustained, being held by the pressure of a corresponding piece D, that is brought down upon it by means of the screw E, that passes through the upper part of the frame; the piece D, swivels on the end of this screw; $a$, is a spring that aids in lifting the piece D, when a plate is to be shifted.

F, F, are the circular shears, and $b, b$, their shafts, the gudgeons of which run in studs, or collars, $c, c$, making parts of the frames G, G, on which they are sustained; which frames G, G, are to be attached firmly by screws, or otherwise, to a sliding half bow, or plate, A', A', which makes a part of the general frame. The bow, and half bow, may be considered as formed by cutting one end of the main bow from the end toward the center, by a vertical plane, dividing said end into two equal parts, and then separating them from each other by a transverse cut as in the line $i, i$, Fig. 1, which line forms the inner end of the sliding half bow. The half bow A', slides by the means of suitable grooves, on the bow, or frame A, as shown at $e, e$, Fig. 3, and may be made fast by means of the tightening screws $d, d$, as shown most distinctly in the section, Fig. 3, their shanks $d', d'$, passing through longitudinal slots in the frame A, A. A part of the longitudinal slots that receive the tightening screws $d, d$, is seen at $h, h$, in Fig. 1. By this arrangement the pairs of shears may be removed together to any desired distance from the center of the machine without disturbing their adjustment to each other. The opening A'', A'' allows space for the plate that is being cut.

In order to arrange the circular shears in such way as that they shall operate in the most advantageous manner in cutting the sheet metal, the frame A, is made with an off-set at its middle, in the form shown in the top view Fig. 2; by which means we are enabled so to arrange the shafts $b$, $b$, as that the acting points of the cutting edges of the circular shears shall operate in a line which shall be a tangent to the circle to which the plate is to be cut.

We have in the drawing represented the shafts $b$, $b$, of the shears as receding from each other, so as to be farther apart at their rear, than they are at their fore ends, an arrangement which we have sometimes made with a view to the allowing of ample room for the passing of the plate and of the portion that is being cut from it, but this inclination of the shafts may be dispensed with by enlarging the size of the circular shears. To prevent the waste portion of the plate as it is cut off from interfering with the cutter shafts and frame, we place guide plates $f$, $f$, of metal, above the lower, and under the upper frames G, G, covering the shafts $b$, $b$, and these effectually perform this office.

Having thus fully described the nature of our improvements in the machine for cutting sheet metal into circular plates, what we claim as new therein, and desire to secure by Letters Patent, is—

Making the main bow, of the form described, in combination with the half bow which carries the shafts or spindles of the circular shears; thereby causing the shafts or spindles of this circular shears to be nearly in a plane with the axis of revolution, and allowing said circular shears to be moved in or out to any required distance without interfering with their adjustment to each other; the said half bow when affixed in place, constituting a part of the main bow, or frame, and the space $A''$, between the cutter shafts, allowing of the free passage between them of the plate that is being cut, thereby admitting of the cutting of any number of circles from the same plate, without its being first necessary to divide said plate into separate parts.

WILLIAM BULKLEY.
PHILIP NORTON.

Witnesses:
   FREEDOM HART,
   ISAAC DOBSON.